United States Patent [19]
Latinen, deceased

[11] 3,812,897
[45] May 28, 1974

[54] WIPED FILM DEVOLATILIZATION PROCESS

[75] Inventor: George A. Latinen, deceased, late of Springfield, Mass. by May V. Latinen, administratrix

[73] Assignee: Monsanto Company, St. Louis, Mo.

[22] Filed: Aug. 11, 1971
(Under Rule 47)

[21] Appl. No.: 171,987

[52] U.S. Cl. ............... 159/49, 159/6 W, 159/13 A, 159/2 E
[51] Int. Cl. ............................ B01d 1/22, B01d 1/28
[58] Field of Search ...... 159/2 E, 6 W, 49, DIG. 10, 159/6 WH

[56] References Cited
UNITED STATES PATENTS

| | | | |
|---|---|---|---|
| 2,944,047 | 7/1960 | Schutze et al. | 260/88.2 |
| 2,992,679 | 7/1961 | Twaddle | 159/2 E |
| 3,067,812 | 12/1962 | Latinen et al. | 159/6 W |
| 3,072,626 | 1/1963 | Cines | 260/93.5 |
| 3,082,816 | 3/1963 | Sladmore | 159/2 E X |
| 3,113,843 | 12/1963 | Wen Han Li | 23/285 |
| 3,203,943 | 8/1965 | Hauser et al. | 260/93.7 |
| 3,240,746 | 3/1966 | Davis | 159/2 E |
| 3,447,582 | 6/1969 | Street | 159/2 E X |
| 3,451,462 | 6/1969 | Szabo et al. | 159/2 E |
| 3,477,491 | 11/1969 | MacHenry et al. | 159/6 W |
| 3,535,737 | 10/1970 | Hendry | 425/203 |
| 3,635,917 | 1/1972 | Roth et al. | 260/79.3 M |

FOREIGN PATENTS OR APPLICATIONS

939,481  10/1963  Great Britain ............... 159/2 E

Primary Examiner—Jack Sofer
Attorney, Agent, or Firm—Joseph S. Nelson; Edward P. Grattan; James C. Logomasini

[57] ABSTRACT

An improved devolatilization process for removing low molecular weight components from a dispersion of polymer in such low molecular weight components. The process employs a zone of separation wherein high mechanical energy dissipation is employed and wherein cocurrent flow of polymer with vapors of low molecular weight components through the separation zone is utilized.

7 Claims, 5 Drawing Figures

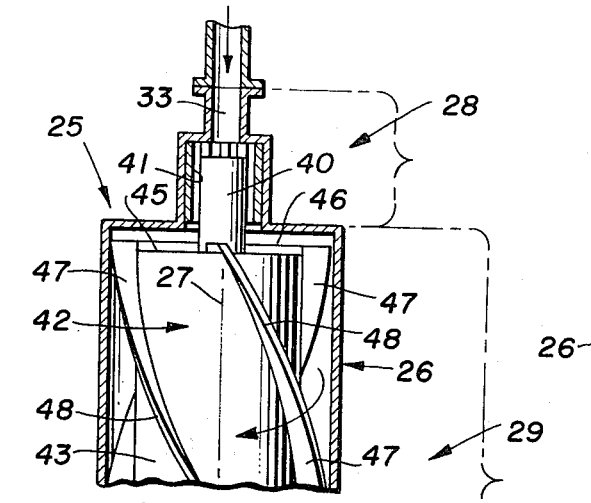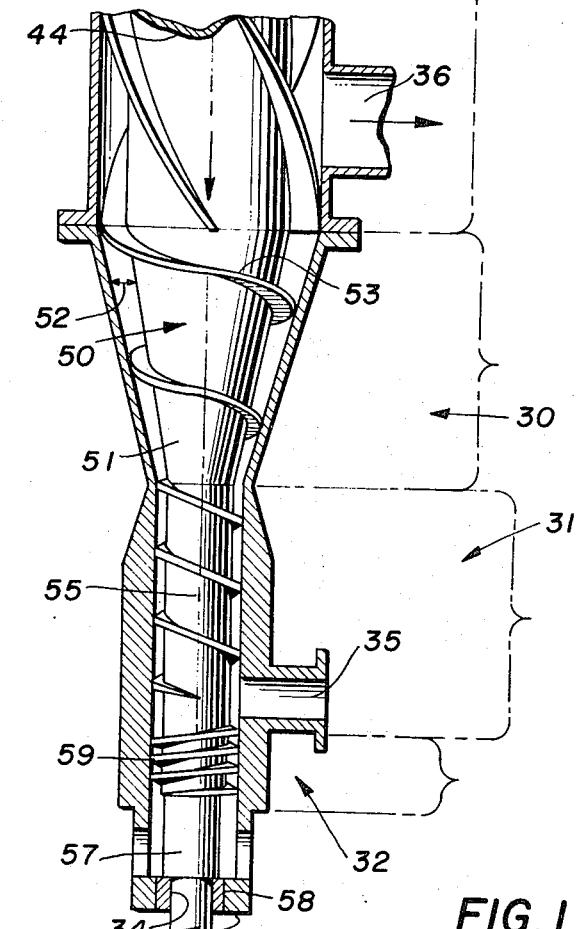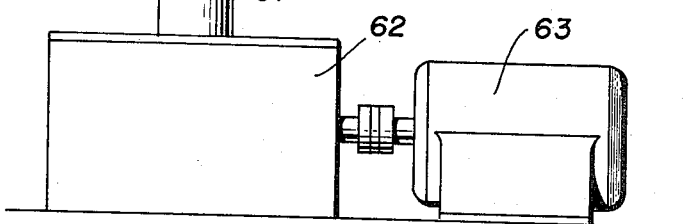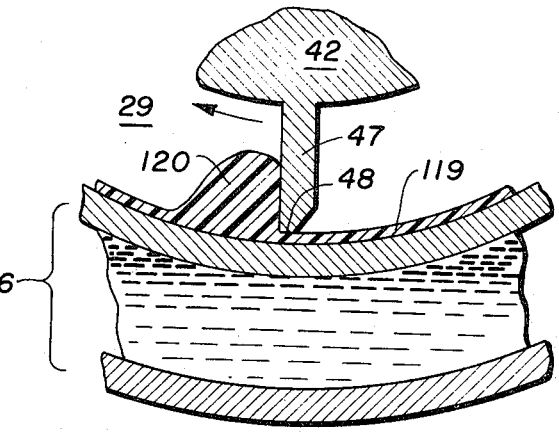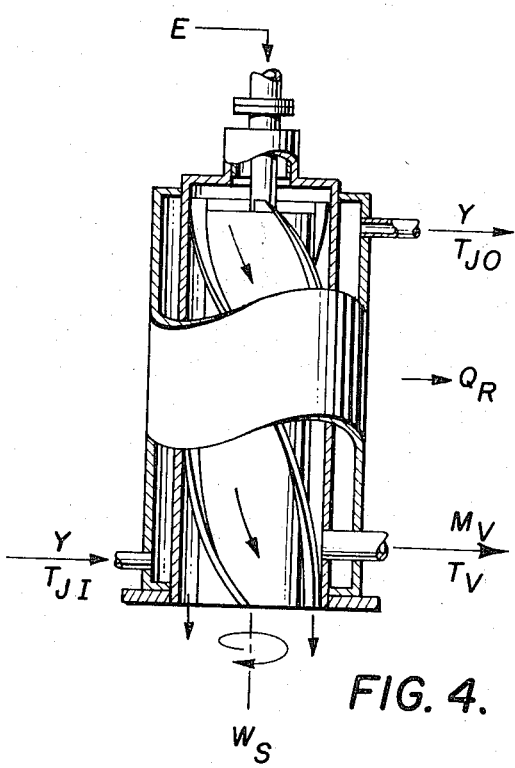

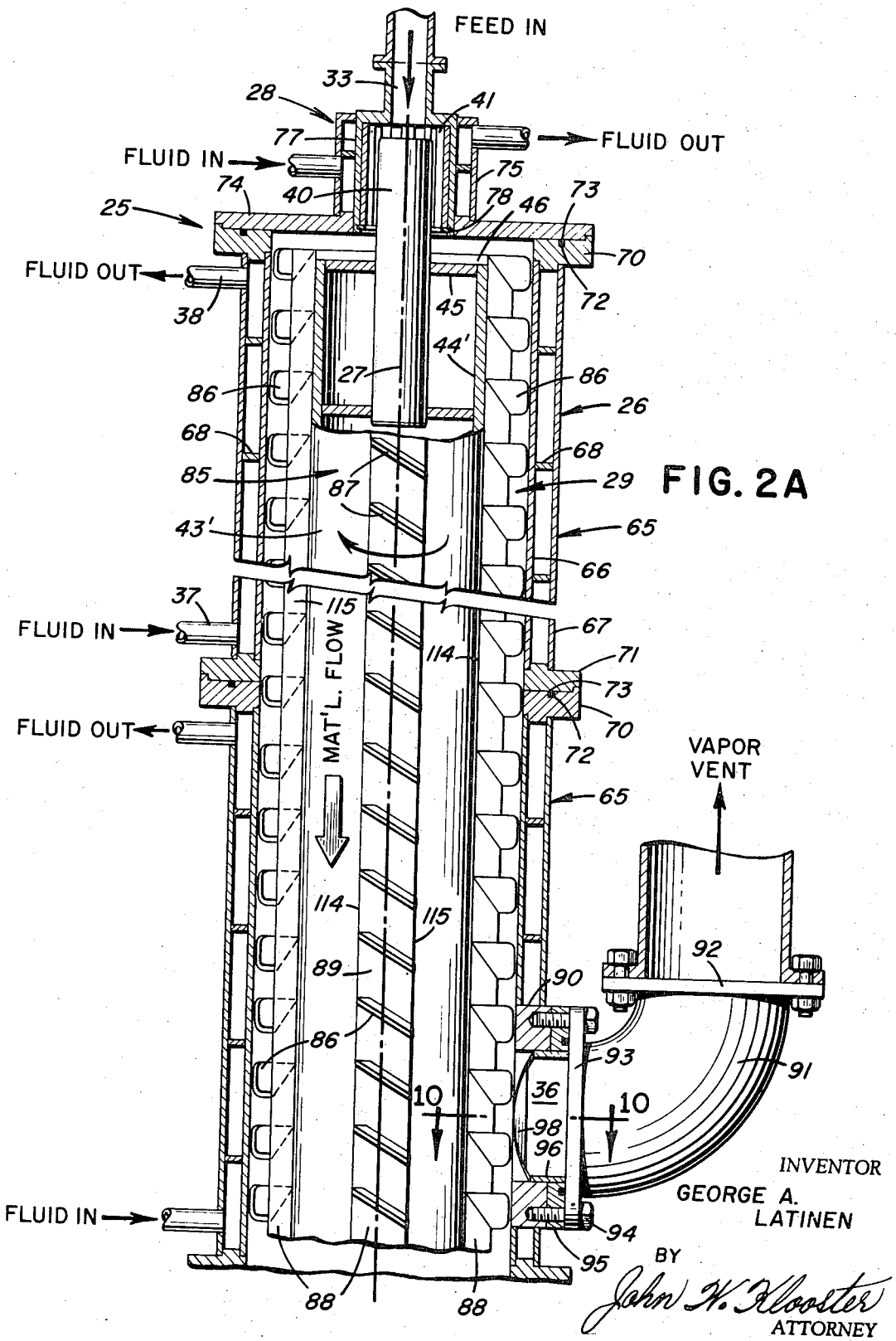

INVENTOR
GEORGE A. LATINEN
BY
John W. Klooster
ATTORNEY

WIPED FILM DEVOLATILIZATION PROCESS

BACKGROUND

In the art of devolatilizing viscous materials, especially polymeric materials, using a wiped film devolatilizer, it has heretofore been conventional and customary to utilize a separation chamber having a screw or rotor assembly revolving therein. The rotor assembly functions to move material being devolatilized axially through the chamber and at the same time to separate the material being devolatilized in the form of a thin film over the circumferentially extending surfaces of the devolatilizer there being a prechosen clearance usually between the circumferential edge regions of the rotor assembly and the circumferentially extending interior walls of the separation chamber.

The heat loss in the separation chamber caused by the volatilization of volatile components from the system being devolatilized has heretofore been made up primarily by supplying heat to the material being devolatilized through the circumferential walls of the devolatilizer by heat transfer. In a conventional devolatilizer's separation chamber, the rotor assembly is designed and chosen so that a minimum of mechanical energy is expended or dissipated in the material being devolatilized. Such a minimum energy dissipation rotor assembly is achieved by constructing the circumferential edge portions of the ratio assembly so as to have the smallest possible land area consistent with the need to accomplish the spreading and movement of material through the separation zone. The concept of small land areas and "thin" rotor blades is particularly well adapted for use with low viscosity systems, and, in general, wiped film devolatilizers have heretofore not been successfully employed in the concentration of polymer melts because of the problem of introducing heat into the melt by heat transfer through the wall of the separation chamber. Thus, polymers which are highly viscous do not lend themselves to conventional devolatilization by wiped film techniques because of the large amount of heat transfer energy needed and because of the poor heat transfer characteristics of polymers. Viscous polymers tend to be poor heat conductors even in the form of thin films, so it is difficult, if not impossible, to achieve efficient devolatilization of polymers with a wiped film devolatilizer which depends primarily upon the transfer of heat through its walls.

An added problem is that many polymeric materials are heat sensitive; they cannot tolerate excessively high temperatures or excessively long exposure periods at higher temperatures without experiencing degradation. To devolatilize a polymeric material using thermal heat transfer, it is necessary to establish high thermal gradients or temperature differences between the wall of the separation chamber and the inside face of a system being devolatilized in order to get sufficient heat into the system for devolatilization. Under such operational conditiona, there is a tendency for degradation of the hotter material near the wall of the separation chamber.

In conventional wiped film devolatilizers, the feed normally enters the separation chamber somewhere between its ends. The liquid is conveyed toward a port located at one end of the chamber and is discharged through this port. The vapor evolved from the liquid passes out a port located at the opposite end of the separation chamber. The feed port is therefore located between the vapor and devolatilized product ports. Vapor is evolved from the liquid as it passes from the feed port to the liquid discharge port. This vapor flows toward and out the vapor port. Therefore it flows countercurrent to the liquid flow past the feed port. The vapor may entrain (perhaps in the form of foam) some liquid into that part of the separation chamber above the feed port and, indeed, many wiped film devolatilizers provide devices for separation of liquid from vapor in this region. In the absence of a main liquid stream flow, there is little tendency for this separated liquid to return to the main liquid stream and it may in fact remain in this region between the feed port and the vapor port for a long time, and in consequence become degraded and discolored. When this material eventually does re-enter the main liquid, it may discolor or otherwise impair the properties of the liquid. The co-current arrangement of this invention, with feed at one extreme end of the separation chamber and product removal at the other completely eliminates this problem.

It has now been discovered that these shortcomings of conventional wiped film devolatilizers can be overcome by utilizing a wiped film devolatilizer having a separation chamber in which relatively large quantities of mechanical energy are dissipated in the polymeric material being devolatilized and by causing the vapor evolved from the material being devolatilized to flow concurrently with such material itself through the separation chamber. The combination of co-current flow of polymeric material being devolatilized and vapor separated therefrom combined with high mechanical energy input surprisingly results in a new and very efficient method for devolatilizing in which most of the shortcomings associated with the prior art are completely circumvented.

SUMMARY

The present invention is directed to an improved devolatilization process for removing a predeterminable portion of low molecular weight components from a dispersion of polymer in such low molecular weight components.

The dispersion comprises on a 100 weight percent basis from about 10 to 99.8 weight percent of said polymer with the balance up to 100 weight percent being said low molecular weight components. The polymer in a devolatilized form is further characterized by having a viscosity falling in the range from about 5,000 to 5,000,000 centipoises, measured at a shear rate of about 10 sec.$^{-1}$ at some temperature in the range from about 0° to 250°C. In addition, the polymer has a number average molecular weight of at least about 3,000. The low molecular weight compontnts are further characterized by having vapor pressures when in substantially pure form of at least about 10 Torr. at a temperature ranging from about −40 to 250°C. In addition, such low molecular weight components have molecular weights not greater than about 325.

The process can be considered to comprise four steps. The first step involves introducing the dispersion into an elongated, crosssectionally circular zone. The dispersion is preheated to a temperature in the range of from about 20 to 350°C., and preferably from 50°C. to 300°C., such that the viscosity of the dispersion at such introduction falls in the range of from about 5,000 to 5,000,000 centipoises. The walls of said zone are maintained at a temperature in the range of from about 20 to 350°C.

The second step can be considered to involve subjecting the dispersion in the zone to the action of blades rotating axially in the zone to the action of blades rotating axially in the zone. Thus, the dispersion in the zone through the action of the rotating blades is to:
  A. spread the dispersion in the form of a thin film over circumferential inside surfaces of said zone,
  B. move the dispersion axially substantially completely through said zone within an average residence time of from about 10 to 1,000 sec., and
  C. maintain the dispersion at a temperature of from about 0 to 350°C. from energy supplied thereto in the form of thermal energy supplied through the circumferential walls of said zone and also in the form of mechanical energy dissipated in said dispersion by the action of said rotating blades thereon, the amount of said mechanical energy dissipated in said dispersion being not less than 30 percent of the total energy supplied to said dispersion in said zone.

While practicing this second step, one maintains:
  1. the ratio of the total volume of non-vaporized dispersion in said zone to the total volume of said zone with substantially no non-vaporized dispersion therein in the range from about 0.1:1 to 5:1,
  2. the ratio of the total land area of said blades to the total circumferential inside surface area of said zone in the range from about 0.003 to 1 to 0.15 to 1,
  3. the tangential velocity of the land portions of said blades in the range from about 2.5 to 60 ft./sec., and
  4. the clearance between said land areas of said blades and the adjacent inside surfaces of said zone in the range from about 0.1 to 0.2 inch.

The third step of the process of the present invention may be considered to involve moving in said zone the non-vaporized dispersion and the vapors evolved therefrom axially through said zone in a substantially co-current fashion.

The fourth step in the process of the present invention may be considered to involve the separating of non-vaporized dispersion from the vapors evolved therefrom. In the steps of separating, moving, and subjecting, as described above, one maintains the absolute pressure in said zone generally at a value which is less than the value of the equilibrium partial pressure of said low molecular weight components in said resulting non-vaporized dispersion at a desired final concentration of said low molecular weight components therein when said resulting non-vaporized dispersion is substantially within the region of said separation.

FIGURE DESCRIPTION

The present invention is better understood by reference to the attached drawings wherein:

FIG. 1 is a schematic, longitudinal sectional view taken along one axis of a devolatilizer assembly suitable for use in the practice of the process of the present invention;

FIGS. 2A and 2B show a detailed longitudinal sectional view of the devolatilizer embodiment shown in FIG. 1; FIG. 2A showing the upper portion of such embodiment and FIG. 2B showing the lower portion thereof, some parts thereof broken away and some parts thereof shown in section;

FIG. 3 is a diagrammatic illustration through the separation chamber in a devolatilizer assembly such as shown in FIG. 1 illustrating the manner in which mechanical energy is dissipated in a dispersion being defined in accordance with the practice of the present invention;

FIG. 4 is a diagrammatic illustration demonstrating one method for determining the relative quantities of mechanical energy and thermal energy dissipated in a dispersion being defined in a separation chamber when practicing the present invention.

DETAILED DESCRIPTION

Figure 2B:
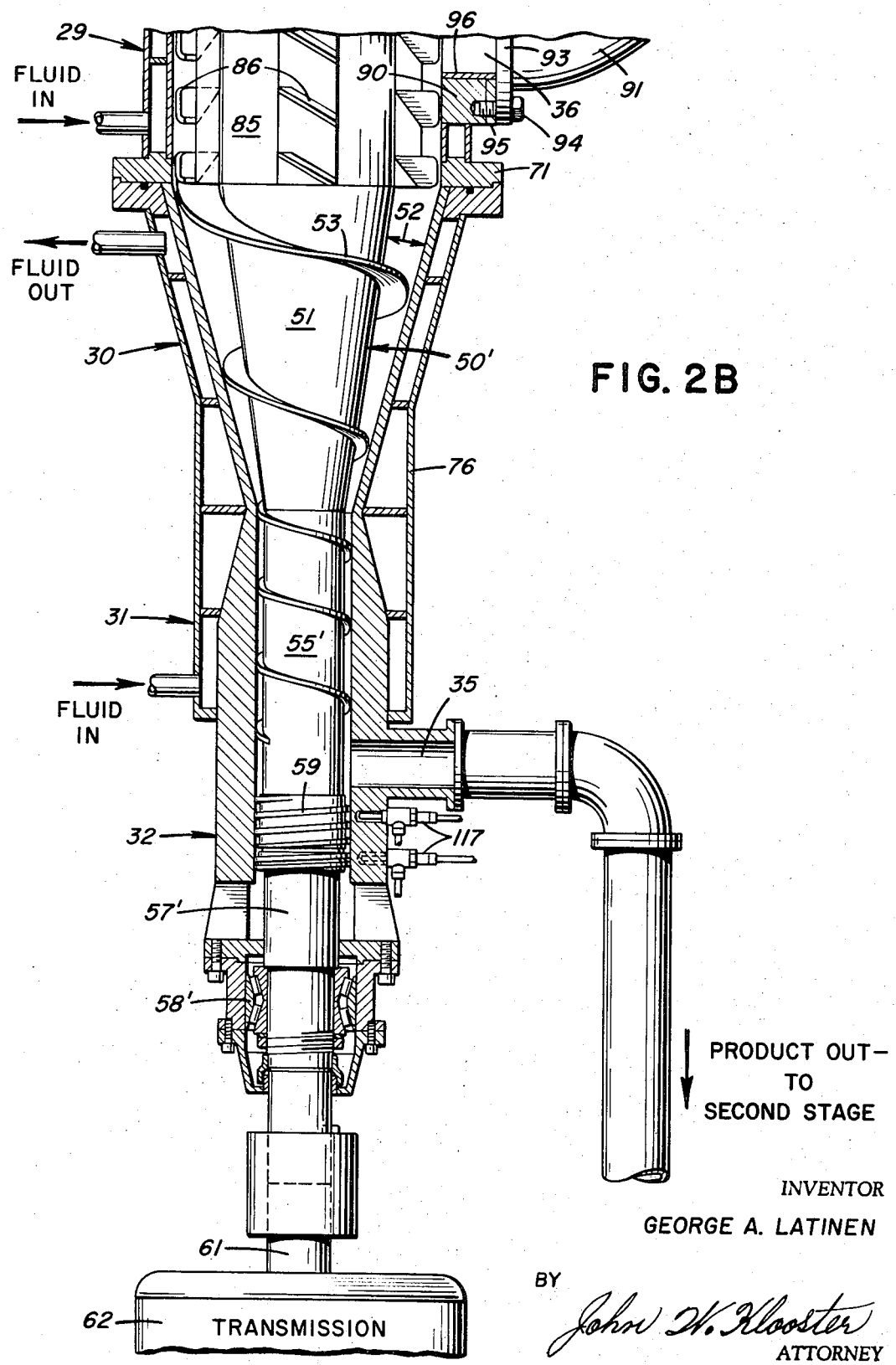

Turning to the drawings, there is seen in FIG. 1 an illustration of a wiped film devolatilizer 25 of the type suitable for the practice of the present invention. Devolatilizer 25 utilizes a housing 26 which in an operative devolatilizer is substantially gas tight and fluid tight. Housing 26 is generally cross-sectionally circular and symmetrical with respect to a common longitudinal axis 27 extending therethrough. Defined within housing 26 at successive adjoining regions along axis 27 are a series of chambers which sequentially comprise an input chamber 28, a vapor separation chamber 29, a compression chamber 30, a pumping chamber 31 and a sealing chamber 32. The housing has defined therein certain apertures. Thus, housing 26 has an input port 33 leading into input chamber 28. A drive shaft entry port 34 is adjacent the sealing chamber 32, though those skilled in the art will appreciate that the drive shaft entry port could be placed at the other end (not shown) of the devolatilizer assembly 25. An output port 35 from pumping chamber 31 is located typically adjacent the sealing chamber 32. A vapor take-off port 36 is located in separation chamber 29, typically and preferably adjacent compression chamber 30.

Within the input chamber 28 and positioned so as to be generally coaxial with axis 27 is a first shaft 40. A splined bushing construction 41 journals shaft 40 for rotational movements and also permits melt material (not shown) during operation of the devolatilizer 25 entering input chamber 28 to pass from port 33 through input chamber 28 and enter into the separation chamber 29 circumferentially about first shaft 40 (see also, for example, FIG. 2A). Thus, in this embodiment sealing means for first shaft 40 is provided by housing 26 itself during operation of the devolatilizer 25 thereby avoiding the necessity for a separate sealing assembly such as is commonly necessary to obtain a fluid seal between a rotating member and a fixed member, as those skilled in the art will appreciate. Additional constructional details for input chamber 28 are given in greater detail hereinafter.

Within separation chamber 29 and located generally coaxially with axis 27 is rotatable rotor assembly, herein designated in its entirety by the numeral 42. Rotor assembly 42 has an axially extending generally enclosed drum 43 with cylindrical side wall portions 44 and an end wall portion 45. End wall 45 is located adjacent input chamber 28. First shaft 40 projects into the vapor separation chamber 29 and interconnects with the end wall portion 45 of drum 43 so that both drum 43 and first shaft 40 are coaxial with axis 27. It will be appreciated that in place of the first shaft 40 within vapor separation chamber 29, one could employ a stub shaft (not shown) on drum 43 which is interconnected with first shaft 40.

One or more radially extending, axially projecting rib members 46 are positioned on end wall 45 between shaft 40 and side wall portions 44. Ribs 46 are adapted to deliver material from the region circumferentially located about first shaft 40 to the region circumferentially located about first shaft 40 to the region circumferentially located adjacent side wall portions 44 of rotor assembly 42. In some applications it is possible to omit the ribs 46 and still obtain satisfactory delivery of material to the circumferentially located region.

Integral, radially projecting, circumferentially extending, helical blade member, or members 47 are located on side wall portions 44. Blade members 47 terminate in land regions 48 at and in their respective circumferentially located, radial outer edge portions. All individual land regions 48 are substantially equally radially spaced from axis 27. Individual blade members 47 are so arranged on the side wall portions 44 of drum 43 that substantially every inside cylindrical surface portion of housing 26 in vapor separation chamber 29 adjacent said side wall portions 44 is swept by at least one of the land regions 48 during each revolution of rotor assembly 42 during operation of devolatilizer 25.

The rotor assembly 42 during operation of devolatilizer 25 rotates and is adapted thereby to produce simultaneously several different effects. Thus, the rotor assembly 42 is adapted to move melt material through the separation chamber 29 from the input chamber 28 to the compression chamber 30. In addition, rotor assembly 42 is adapted to spread in the form of a thin film (not shown) at least a portion of melt material in the separation chamber 29 over inside cylindrical surface portions of housing 26 in separation chamber 29. Finally, rotor assembly 42 is adapted to produce cocurrent movement of vapors (which have escaped from melt material) and melt material in the separation chamber 29 as the melt material courses through separation chamber 29 to vapor take-off port 36.

Generally positioned within compression chamber 30 and generally coaxial with axis 27 is a compression screw 50. Compression screw 50 has a shaft portion 51 whose diameter is so related to the inside diameter of housing 26 in the region of compression chamber 30 along the axial length thereof that the radial distance 52 between shaft portion 51 and the inside cylindrical surface portions of housing 26 in the region of compression chamber 30 generally continuously declines along axis 27 proceeding in a direction from separation chamber 29 towards pumping chamber 31. Shaft portion 51 adjacent separation chamber 29 is integral with the side wall portions 44 of drum 43.

Peripherally located, circumferentially extending, and radially projecting is a helical rib 53 which is integral with shaft portion 51. The width of rib 53 in a radial direction is such as to bring the peripheral outside edge portion or land area of rib 53 proximately to the inside cylindrical surface portions of housing 26 in the region of compression chamber 30. The compression screw 50 is thus adapted to collect, compress and convey melt material from separation chamber 29 to pumping chamber 31 during operation of devolatilizer 25.

Generally positioned within the pumping chamber 31 and generally coaxial with axis 27 is a pump screw 55.

Pump screw 55 is of conventional design and is adapted to pressurize and convey melt material from compression chamber 30 to melt output port 35. Pump screw 55 adjacent compression chamber 30 is integral with shaft portion 51.

Generally positioned within sealing chamber 32 and generally coaxial with axis 27 is a second shaft 57. Bearing or journal means 58 generally associated with sealing chamber 32 journals and mounts second shaft 57 for rotational movements axially. Adjacent pumping chamber 31, second shaft 57 is integral with pump screw 55.

Generally associated with sealing chamber 32 and adapted to make sealing engagement between second shaft 57 and housing 26 during operation of devolatilizer 25 is a conventional type viscoseal screw assembly 59, though those skilled in the art will appreciate that any conventional sealing means can be used here to achieve sealing engagement between second shaft 57 and housing 26.

Thus, in devolatilizer 25, there is a screw assembly comprising first shaft 40, rotor assembly 42, compression screw 50, extruder screw 55 and second shaft 57. To rotatably drive this screw assembly, power transfer means is provided. In the embodiment shown, such means is provided by short shaft 61 which drives second shaft 57 in a drive such that the screw assembly moves melt material from input port 33 to product output port 35 within housing 26. In turn, shaft 61 is driven by transmission 62, transmission 62 itself being operated by electric motor 63.

Referring to FIGS. 2A and 2B, there is seen a detailed view of devolatilizer 25, but equipped with an alternative rotor assembly which is herein designated in its entirety by the numeral 85. For reasons of constructional convenience, it is convenient to manufacture housing 26 in the form of subassembly sections which are assembled together to form completed housing 26. In the region of vapor separation chamber 29, typical section 65 of housing 26 is seen to be of double walled cylindrical construction, there being an interior cylindrical wall 66 and an outer cylindrical wall 67. The walls 66 and 67 are maintained in fixed predetermined spaced relationship one to the other by means of spacer members 68.

One end of section 65 ends in a male flange member 70, while the other end thereof ends in a female flange member 71. In the flat facing portion of flange 70, a circular groove 72 is provided for receipt of a seal 73. Thus, in an assembled housing 26, flanges 70 and 71, one each on abutting sections 65 (paired), matingly engage into a sealed relationship between one another by means of seal 73.

It will be appreciated that a devolatilizer 25 is conveniently formed of steel or other suitable metal or alloy with individual pieces being welded or clamped together. Thus, adjacent sections 65 are conveniently secured together by clamping means, welding, or the like.

The flanges 70 and 71 on a pair of abutting sections 65 may be conveniently secured together by C-clamps, nut and bolt assemblies, or the like (not shown). Section 65 is conveniently constructed so that inner-cylindrical wall 66 and outer-cylindrical wall 67 are in fluid tight relationship to one another, in cooperation with flanges 70 and 71 and spacer members 68 so that an appropriate heating or cooling fluid (not shown) can be circulated in the open spaces of a section 65 between walls 66 and 67, thereby to heat or cool a section 65 in a controllable manner. Typically, when a devolatilizer 25 is being used with a polymer melt, a section 65 is maintained in a heated condition relative to the surrounding ambient embodiment, the heating being accomplished by using heated water, oil, or the like, as those skilled in the art appreciate. Such a temperature controlling fluid is conveniently injected into a section 65 through an input nozzle 37 and removed therefrom through an output nozzle 38. It will be appreciated that heating may also be accomplished by other methods, e.g. electrical heaters applied directly to wall 66; induction heating; or by locating the devolatilizer assembly in a fluidized bed with appropriate heating means.

It will also be appreciated that in some cases no thermal heating means at all will be required, i.e., all the energy input to devolatilizer 25 will be mechanical energy.

In order to control the temperature of the melt material passing through a devolatilizer 25, it may also be desirable to jacket housing 26 in the regions of input chamber 28, compression chamber 30, and pumping chamber 31. Typically, in a devolatilization operation being performed on a polymer in devolatilizer 25, these chambers, like separation chamber 29, are maintained in a heated condition. Thus, input chamber 28 is equipped with jacket assembly 75 and compression chamber 30 and pumping chamber 31 are equipped with jacket assembly 76. Conventional flow paths for fluids into and from jackets 75 and 76 are indicated. Conveniently located, in proximity to a devolatilizer 25 when a heating fluid is employed is apparatus (not shown) for heating such a temperature control fluid and for maintaining such fluid at a predetermined feed temperature to devolatilizer 25, as those skilled in the art will fully appreciate. Because of the possibility of excessive heat buildup in an operating devolatilizer 25 in the region of sealing chamber 32, suitable cooling means for this chamber 32 is preferably provided, such as by cold fingers 117, through which a coolant is circulated. Apparatus (not shown) for pumping coolant at a suitable rate and at a suitable temperature is provided located in proximity to a devolatilizer 25.

Bridging the region between separation chamber 29 and input chamber 28 is a cap plate 74 which joins together a first section 65 and a shell 77 which forms the wall of input chamber 28. Shell 77 is jacketed by jacket assembly 75 in the region of input chamber 28. Interior cylindrical wall surfaces of shell 77 are lined by a splined bushing 41, the bushing 41 being conveniently maintained in position by a retaining ring and key assembly. Positioned in input chamber 28 so as to be generally coaxial with shell 77 and splined bushing 41 is first shaft 40. When a hot melt (not shown) enters input chamber 28, such passes through the splined bushing 41. Such a melt further serves to lubricate bushing 41. Thus a melt from input chamber 28 is circumferentially fed into vapor separation chamber 29 about first shaft 40.

Those skilled in the art will appreciate that, in place of the splined bushing 41, one can employ any one of a number of different but functionally equivalent mechanical arrangements in order to achieve delivery, as desired, of melt material from imput chamber 28 to separation chamber 29 circumferentially of a first shaft 40. In general, any arrangement of elements which will permit one to deliver melt material from an imput port through an input chamber to a vapor separation chamber in a manner so as to be circumferentially located about a rotatable shaft may be used in practicing the present invention.

As a rotor assembly 42 for use in vapor separation chamber 29, one may employ any one of a number of different but functionally equivalent means in order to process melt material in the vapor separation chamber 29, as described. One preferred rotor assembly is seen in the embodiment shown in FIGS. 2A and 2B and is herein designated in its entirety by the numeral 85. In rotor assembly 85, a drum 43' is employed whose side wall portions 44' extend radially outwardly a plurality of discrete blade-like members 86. These blade members 86 are arranged into four axially extending rows. These rows are in circumferentially spaced relationship to one another and each now contains approximately an equal number of blade members 86. Although the embodiment shown utilizes four rows, it will be appreciated that any convenient number of rows can be used from two to about eight, three or four rows presently being preferred. All blade members 86 are circumferentially inclined at an angle between about 10 and 85° with respect to rotor assembly axis 27. In the embodiment shown, each blade member is inclined at a fixed angle of about 30°. Each of the blade members 86 in any given row are generally equally axially spaced from one another. Each blade member 86 has a land portion 87 defined on its circumferentially extending radially outward edge portion. All the land areas of the individual blade members 86 are substantially equally radially spaced from axis 27. In general, the blade-like flattened members 86 are so arranged on side wall portions 44' that substantially all cylindrical regions on the inside walls of separation chamber 29 adjacent the side wall portions 44' of drum 43' are swept by at least one land portion 87 during a single rotation of rotor assembly 85. Thus, each point in the separation chamber 27 adjacent side wall portions 44' has both an axial and a circumferential force vector exerted thereon during rotational movements of the rotor assembly 85.

In rotor assembly 85, between blade member 86 and the side wall portions 44' of drum 43' is an axially extending flange 88 which extends axially under each row of blade members 86. Each flange 88 defines a circumferentially rising ramp-like outside face 89 and has a leading edge 114 and a trailing edge 115. Edges 114 and 115 extend axially and are in circumferentially spaced, parallel relationship to one another. The trailing edge 115 of each flange 88 defines the maximum height of a flange 88 above the circumferential surface of side wall portions 44'. The direction of circumferential rise for all outside faces 89 is substantially the same. The number of flanges 88 employed in a given rotor assembly 85 can vary, the number being generally equal to the number of rows of blade members 86 employed in a given rotor assembly 85.

With rotor assembly 85, as shown in FIGS. 2A and 2B, there are employed a compression screw 50 and a pumping screw 55 each of which is like the corresponding members used in the embodiment of FIG. 1 for rotor assembly 42.

In FIG. 2B, it is seen that a thrust bearing assembly 58' for shaft 57' is employed. Bearing assembly 58' is adjacent to, but somewhat axially spaced from, sealing chamber 32 to isolate bearing assembly 58' from sealing chamber 32 in case of any fluid leakage from chamber 32.

One preferred construction for the region in the vicinity of the vapor take-off port 36 in housing 26 is illustrated by FIG. 2A. Extending through a section 65 is an appropriately shaped mounting flange 90. Connected to flange 90 is an elbow pipe 91 which, at its respective input and output ends, is equipped with respective flanges 92 and 93. Extending through flange 93 to couple elbow pipe 91 to flange 90 are a series of bolts 94 which threadably engage mating threading recesses in flange 90. Positioned between flange 93 and flange 90 is a ring 95 of metal. Connected (as by welding or the like) to the interior circumference of ring 95 is a sleeve 96. Mounted on the inside circumferential surface portion of sleeve 96 are wedge-shaped flanges 98 which act as baffles to reject melt material within separation chamber 29 which might tend to enter and pass through the vapor take-off port 36 during rotational movements of rotor assembly 85 in operation of devolatilizer 25. While the devolatilizer 25 is operable without flanges 97 and 98 since by the present invention there is only slight tendency for melt material to enter through vapor take-off port 36 from vapor separation chamber 29, it will be appreciated that the efficiency of operation of devolatilizer 25 is improved by the presence of flanges 97 and 98, or equivalent assembly, in a devolatilizer 25.

Housing 26 as illustrated in FIGS. 2A and 2B in devolatilizer 25 is generally conically shaped in the region of compression chamber 30, being tapered from a maximum diameter adjacent the region of separation chamber 29 to a final minimum diameter adjacent the region of pumping chamber 31. The thickness of housing 26 in the region of pumping chamber 31 is increased so that housing 26 can withstand the pressures developed here during operation of devolatilizer 25. A single jacket assembly 76 circumferentially embraces housing 26 in the adjoining regions of the compression chamber 30 and the pumping chamber 31.

The operation of devolatilizer 25 and rotor assembly 42, in the separation chamber 29 is illustrated in FIG. 3. As melt material moves axially through the separation chamber 29, such melt material is seen to be distributed in the form of a thin film 119 on the inside cylindrical surface portions of housing 26 within the separation chamber 29. Concurrently, as the rotor assembly 42 turns, a species of wave 120 exists just in front of the land region 48 on each blade member 47. Owing to the fluid mechanical nature of the melt material, in the course of a plurality of revolutions of rotor assembly 42, the melt material comprising a thin film 119 gradually becomes caught up and becomes a part of wave 120, only to be redeposited at a further point on the side wall of housing 26 in vapor separation chamber 29 at a further point on downwardly in the vapor separation chamber 29. The process is gradually repeated for all melt material in vapor separation 29 until all material entering input chamber 28 is expelled through the product output port 35. In the circumferential region immediately adjacent housing 26, very little fluid movement occurs in film 119, but the rate of fluid movement in thin film 119 increases as one moves radially towards a land region 48. Mechanical energy dissipation takes place in melt material by the action of blade member 47 on thin film 119 and on wave 120.

Although the housing 26 is externally tapered downwardly about compression chamber 30 from a maximum to a minimum cross-sectional diameter in the region of pumping chamber 31, such a taper is not necessary in order to practice the present invention. Thus, for example, one may employ a housing whose cross-sectional diameter substantially is constant through the various chambers.

As starting materials for use in the practice of the present invention, one employs, as indicated above, a dispersion of a polymer in low molecular weight components. Any of a very wide variety of polymers can be used. Typical examples include members of the styrene polymer family such as homopolystyrene, styrene/acrylonitrile copolymer, graft copolymers of styrene on a preformed elastomeric substrate (such as a butadiene polymer) and graft copolymers of styrene and acrylonitrile on a preformed elastomeric substrate. Other polymers include polyolefins such as polyethylene, polyesters, polyamides, polycarbonates, and the like. The viscosity characteristics of the starting polymer and the composition of the low molecular weight components can vary over very large ranges. The exact value being generally unimportant. The operation of equipment suitable for use in the practice of the present invention is relatively simple and is based upon a mere selection of operating conditions which will result in a predetermined quantity of low molecular weight components in a product devolatilized polymer.

Commonly, the low molecular weight components present in a starting polymer dispersion are either monomers of the polymer or are solvent or diluent hydrocarbon materials which are present during polymerization, for example, during polymerization conditions of the continuous mass type.

Those skilled in the art will appreciate that the process of the present invention is suitable for use as a unit process in a continuous manufacturing operation for the production of a polymeric material; the first unit process being polymerization, and the second unit process being the present invention. Those skilled in the art will further appreciate that it is desirable and practical to practice the present invention by using a sequence or series of separate separation chambers wherein a given starting dispersion is serially and continuously fed through a succession of said chambers, each of the chambers being operated under conditions which satisfy the process teachings of the present invention. In general, the present invention involves physical separation without mechanical interaction between a polymer and low molecular weight components.

In the practice of this invention, of the total energy acquired by a dispersion from the time it enters a wiped film devolatilizing separation chamber until the time it leaves such separation chamber as devolatilized polymer melt consists of a minimum of 30 percent mechanical energy supplied by the rotor assembly with the remaining energy input being thermal energy, supplied by transfer of heat energy from a heating medium through the cylindrical wall of such separation chamber.

This invention may be practiced in combination with a variety of associated equipment and with different types of heating means. The determination of the amount of mechanical energy input supplied to a dispersion separation chamber is made by application of appropriate thermodynamic principles and measurement means depending upon the particular wiped film devolatilization equipment being used. By way of illustration, the simplest limiting case is first considered. In this case the melt is discharged to low pressure, so the pumping screw is short and the power dissipated in the pumping screw is so small as to be negligible. The power losses in the journals, seals and compression chamber are likewise so small as to be negligible.

Therefore substantially all the energy transmitted to the drive shaft by transmission 62 is dissipated in the separation chamber 29 and is applied to the dispersion in the separation chamber. Referring to FIG. 4, the mechanical energy input E into the separation chamber is:

(1) $E = JW_s$, where $W_s$ is the mechanical energy input to the shaft and $J$ is the factor required to convert mechanical to thermal energy units.

The thermal energy input Q into the separation chamber is:

(2) $YC_p(T_{JI}-T_{JO}) - Q_r$, where $Y$ is the mass flow of oil or heating fluid in the chamber jacket, $C_p$ is the heat capacity of the heating fluid, $T_{JI}$ and $T_{JO}$ are the temperatures of the heating fluid at the jacket inlet and outlet, respectively, and $Q_r$ is the total heat loss from the separation chamber to its outside surrounding environment by radiation, conduction and convection mechanisms combined. For most cases, $Q_r$ may be accurately approximated in a separate measurement by the relation:

(3) $Q_r = Y_{cp}(T_{JI}'-T_{JO}')$, where $T_{JI}'$ and $T_{JO}'$ are the input and output heating fluid temperatures, respectively, with the devolatilizer rotor not operating and with no feed to the devolatilizers under the restriction:

(4) $(T_{JI}+T_{JO})/2 = (T_{JI}'+T_{JO}')/2$, i.e. the mean of the heating fluid temperature is the same.

The total energy input to the separation chamber H is defined by the equation:

(5) $H = E+Q$, and the present case where 30 percent or more of the energy input is mechanical is defined by the relation: $100 (E/H) \geq 30$ It is noted that in the practice of this invention, Q may be negative, i.e. the jacket about the separation chamber may actually extract heat from the dispersion in the separation chamber, as a consequence of which E is then greater than H. This condition may occur in cases where the dispersion being processed is heat labile and it is necessary to accomplish the devolatilization with the lowest possile exposure to high temperatures.

It will be apparent to those skilled in the art of making and interpreting energy measurements that the relative amounts of thermal and mechanical energy may be determined in other ways. For example, the total energy input may be determined from the difference in the enthalpies of the output vapor and melt streams combined and of the input polymer stream if measurements of the flow rates and temperatures are made. These are the quantities $P_{MI}$, $P_{MP}$, $T_{MP}$, $M_V$ and $T_V$ shown in FIG. 4. This well-known technique is discussed in standard references such as Hougan, O.A., K. M. Watson and R. A. Rogatz, *Chemical Process Principles*, Part I, Chapter VIII, New York, John Wiley & Sons (1954). This result combined with measurement of either the heat transferred from the jacket or the mechanical energy input leads to establishment of the relative amounts of mechanical and thermal energy by obvious and well known methods.

In many real cases, using apparatus such as is shown in FIGS. 2A and 2B, substantial amounts of energy are dissipated in the pumping screw, compression chamber and seals. In this case, the mechanical energy put into this separation chamber cannot be obtained directly by a measure of the power put into the motor drive shaft. In such cases, the total power put into the shaft is measured and the power comsumed in the other section estimated and then subtracted from the total power input to give the mechanical energy input to the separation chamber. Such an estimation is relatively easy to make. Thus, the seals and pumping screws outside the separation chamber and the relatively small compression chamber are most completely filled with dispersion. The power consumed by screws completely filled with melt is estimatable by well-known methods (e.g. Schenkel,G, *Plastics Extrusion Technology and Theory*, p. 142 et seq., London, Iliffe Books Ltd., 1963).

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

EXAMPLES A THROUGH F

Dispersions of polymer in low molecular weight components are prepared. The characteristics and composition of each such dispersion are each given below in Table I.

TABLE I.—DISPERSIONS EMPLOYED

| Dispersion run number | Dispersion composition (wt. percent) | | Polymer | | | | Low molecular weight (volatile) components | | Slightly volatile components with molecular weight over about 300 or vapor pressure under 10 torr (wt. percent) |
|---|---|---|---|---|---|---|---|---|---|
| | Polymer | Volatile components | Type | Number average mol. wt. | Viscosity at 1D sec.⁻¹ shear rate (centipoise) | Temp. at which viscosity was measured (° C.) | Volatile components with molecular weight under 325 (percent of total composition) | Temp. at which vapor pressure is 10 torr (° C.) | |
| A | 70 | 30 | (1) | 80,000 | 3,000,000 | 210 | Styrene monomer, 27%<br>Ethylene benzene, 2%<br>Styrene dimer, 1% | 31<br>26<br>150 | 0.5 |
| B | 99.5 | 0.5 | (1) | 70,000 | 2,500,000 | 210 | Styrene monomer, 0.1%<br>Ethylene benzene, 0.2%<br>Styrene dimer, 0.2% | 31<br>26<br>150 | 0.002 |
| C | 65 | 35 | (2) | 50,000 | 3,000,000 | 232 | Styrene monomer, 25%<br>Acrylonitrile, 9%<br>Ethyl benzene, 1% | 31<br>−20<br>26 | 0.1 |
| D | 90 | 10 | (3) | 60,000' | 4,000,000 | 210 | Styrene monomer, 9.4%<br>Ethyl benzene, 0.5%<br>Styrene dimer, 0.10% | 31<br>26<br>150 | 0.2 |
| E | 50 | 50 | (4) | 40,000' | 4,000,000 | 210 | Styrene monomer, 25%<br>Acrylonitrile, 23%<br>Ethyl benzene, 1%<br>Styrene dimer, 1% | 31<br>−20<br>26<br>150 | 1.0 |
| F | 35 | 65 | (5) | 250,000 | 1,000,000 | 200 | Hexane, 65% | −25 | 0 |

NOTE.—(1)=Polystyrene. (2)=Styrene-acrylonitrile copolymer: 28% (wt.) acrylonitrile, 72% (wt.) styrene. (3)=High impact polystyrene: 6% polybutadiene, 94% rubber. (4)=ABS: 54% (wt.) styrene, 26% (wt.) acrylonitrile, 20% (wt.) butadiene. (5)=Polyethylene.

EXAMPLES 1 THROUGH 9

Each of the foregoing dispersions is subject to devolatilization in accordance with the practices and teachings of the present invention using an apparatus illustrated in FIGS. 1, 2A and 2B and each as described above. The conditions of devolatilization for each such dispersion and the results obtained in each instance are as given below in Table II.

FOOT NOTES:
1. Dispersion Run 1A employed as feed the effluent from Dispersion Run 1. Two devolatilizers in series were used.
2. Dispersion Run 3A employed as feed the effluent from Dispersion Run 3. Two devolatilizers in series were used.
3. Dispersion Run 5A employed as feed the effluent from Dispersion Run 5. Two devolatilizers in series were used.
4. Thermal energy is extracted from separation chamber to fluid in separation chamber jacket.

What is claimed is:

1. In an improved wiped film devolatilization process for removing a predeterminable proportion of low molecular weight components as volatiles from a dispersion of polymer in such low molecular weight components, said dispersion comprising on a 100 weight percent basis from about 10 to 99.8 weight percent of said polymer with the balance up to 100 weight percent being said low molecular weight components, said polymer in a devolatilized form being further characterized by having a viscosity falling in the range from about 5,000 to 5,000,000 centipoises, measured at a shear rate of about $10^{sec.^{-1}}$ in the temperature range of from about 0 to 250°C. and by having a number average molecular weight of at least about 3,000, said low molecular weight components being further characterized by having a vapor pressure when in a substantially pure form of at least about 10 Torr at a temperature ranging from about −40 to 250°C. and by having molecular weights such that at least about 95 weight percent thereof individually have molecular weights not greater than about 325, said process comprising the steps of:
   A. introducing said dispersion into an elongated cross-sectionally circular zone, said dispersion having been preheated to a temperature in the range from about 20 to 350°C. such that the viscosity of said dispersion at such introduction falls in the range of from about 5,000 to 5,000,000 centipoises at a shear rate of $10^{sec.^{-1}}$, the walls of said zone being maintained at a temperature in the range of from about 20 to 350°C.,
   B. subjecting said dispersion in said zone to the action of circumferentially inclined blades rotating axially therein, said dispersion in said zone being:
      1. spread in the form of a thin annular film over circumferential inside surfaces of said zone,
      2. moved axially substantially completely through said zone within an average residence time of from about 10 to 1,000 sec., and
      3. maintained at a temperature of from about 0 to 350°C. from energy supplied thereto in the form of thermal energy supplied through the circumferential walls of said zone and also in the form

TABLE II.—DEVOLATILIZATION CONDITIONS

| Ex. No. | Dispersion run no. | Dispersion preheat temp. (°C.) | Input viscosity at preheat temp. and 10 sec.⁻¹ shear rate (cp.) | Separation chamber wall temperature (°C.) Melt inlet end | Separation chamber wall temperature (°C.) Melt outlet end | Average residence time in separation chamber of melt (sec.) | Temp. of devolatilized dispersion flowing from separation chamber (°C.) | Ratio of total volume of nonvaporized dispersion in separation zone to volume of dispersion in separation zone | Tangential velocity of land portions (ft./sec.) | Clearance between land portions and separation chamber wall (in.) | Length/diameter of separation chamber | Pressure separation chamber (torr) | Partial pressure of residual volatiles in dispersion measured at vapor take-off | Ratio of mechanical energy to total energy supplied to separation chamber ×100 (percent) | Composition of devolatilized dispersion (wt. percent) Polymer | Composition of devolatilized dispersion (wt. percent) Low molecular weight components | Viscosity of devolatilized dispersion Viscosity at 10 sec.⁻¹ shear rate (cp.) | Viscosity of devolatilized dispersion Temp. at which viscosity is measured (°C.) |
|---|---|---|---|---|---|---|---|---|---|---|---|---|---|---|---|---|---|---|
| 1 | A1¹ | 150 | 10,500 | 225 | 228 | 120 | 210 | 0.08 | 12.8 | 0.062 | 4.3 | 70.0 | 270.0 | 50 | 97.5 | 2.5 | 50,000 | 240 |
| 2 | A2¹ | 210 | 250,000 | 210 | 212 | 105 | 240 | 0.10 | 7.0 | 0.062 | 4.3 | 6.0 | 17.0 | ⁴120 | 99.9 | 0.1 | 2,000,000 | 240 |
| 3 | B | 220 | 300,000 | 210 | 222 | 103 | 235 | 0.10 | 7.0 | 0.062 | 4.3 | 6.0 | 16.0 | ⁴110 | 99.9 | 0.1 | 2,100,000 | 235 |
| 4 | C | 145 | 25,000 | 200 | 198 | 20 | 200 | 0.045 | 2.1 | 0.005 | 4.0 | 140.000 | 300.0 | 60 | 97.2 | 2.8 | 400,000 | 200 |
| 5 | C2² | 200 | 400,000 | 230 | 232 | 25 | 240 | 0.05 | 1.8 | 0.005 | 4.0 | 5.0 | 21.0 | 95 | 99.9 | 0.1 | 400,000 | 240 |
| 6 | D | 205 | 1,000,000 | 240 | 242 | 23 | 250 | 0.06 | 3.5 | 0.005 | 4.0 | 1.90 | 70.0 | 80 | 99.8 | 0.2 | 2,000,000 | 240 |
| 7 | E | 115 | 100,000 | 210 | 208 | 25 | 235 | 0.045 | 2.5 | 0.005 | 4.0 | 4.0 | 280.0 | 40 | 98.0 | 2.0 | 1,700,000 | 235 |
| 8 | E3³ | 205 | 1,500,000 | 230 | 232 | 18 | 235 | 0.05 | 2.0 | 0.005 | 4.0 | 1.90 | 15.0 | 90 | 99.9 | 0.1 | 1,500,000 | 235 |
| 9 | F | 100 | 6,000 | 200 | 202 | 30 | 190 | 0.07 | 7.0 | 0.030 | 8.0 | 500.0 | 1,000.0 | 50 | 99.0 | 1.0 | 300,000 | 200 |

See note at the bottom of Table I.

of mechanical energy dissipated in said dispersion by the action of said rotating blades thereon, said subjecting being accomplished while maintaining the ratio of the volume of non-vaporized dispersion in said zone to the total volume of said zone in the range of from about 0.01:1 to 0.5:1, C. moving in said zone said dispersion axially through said zone as a melt material and D. separating the resulting non-vaporized dispersion from said vapors evolved therefrom, said separating, said moving, and said subjecting being conducted while maintaining the absolute pressure in said zone generally at a value which is less than the value of the equilibrium partial pressure of said low molecular weight components in said resulting non-vaporized dispersion at the desired concentration of said low molecular weight components therein when said resulting non-vaporized dispersion is substantially within the region of said separation, the improvement which comprises:

E. removing said separated volatiles from said zone during separation step D at a take-off port located in the downstream end of said zone, said take-off port being located so as to cause said volatiles to move axially and cocurrently through the zone with said dispersion in step C thereby minimizing foaming at said take-off port and eliminating degradation of the polymer providing efficient devolatilization of said dispersion.

2. The process of claim 1, wherein the amount of mechanical energy dissipated in said dispersion during said subjecting step B is not less than 30 percent of the total energy supplied to said dispersion in said zone said mechanical energy being dissipated in said dispersion by spreading said dispersion over the circumferential inside surface of said zone as a thin film and moving said film axially as waves in front of the land region of said blades.

3. The process of claim 2 wherein the separated said dispersion is reprocessed a second time by the sequence of steps comprising said introducing, said subjecting, said moving, said separating and said removing.

4. The process of claim 2 wherein said dispersion comprises from about 50 to 75 weight percent homopolystyrene, and, correspondingly, from about 25 to 50 weight percent styrene monomer.

5. The process of claim 2 wherein said dispersion comprises from about 50 to 75 weight percent styrene/acrylonitrile copolymer, and, correspondingly, from about 25 to 50 weight percent of a mixture of styrene and acrylonitrile monomers.

6. The process of claim 2 wherein said dispersion comprises from about 50 to 75 weight percent of a graft copolymer of styrene upon a preformed elastomeric substrate with the balance up to 100 weight percent comprising styrene monomer.

7. The process of claim 2 wherein said dispersion comprises from about 50 to 75 weight percent of a graft copolymer of styrene and acrylonitrile on a preformed elastomeric substrate, and, correspondingly, from about 25 to 50 weight percent of a mixture of styrene and acrylonitrile monomers.

* * * * *

UNITED STATES PATENT OFFICE
CERTIFICATE OF CORRECTION

Patent No. 3,812,897     Dated May 28, 1974

Inventor(s) George A. Latinen

It is certified that error appears in the above-identified patent and that said Letters Patent are hereby corrected as shown below:

Col. 1, line 29, after "the" delete "ratio" and insert
- - - rotor - - -.
Col. 1, line 59, after "operational" delete "conditiona"
and insert - - - conditions - - -.
Col. 3, line 5, after "zone" delete "to the action of
blades rotating axially in the zone".
Col. 9, line 18, after "flanges" delete "97 and".
Col. 9, line 23, after "flanges" delete "97 and".
Col. 10, line 44, after "without" delete "mechanical"
and insert - - - chemical - - -.
Col. 11, line 33, after "H" delete "-" and insert
- - - = - - -.
Table I, last line after "94%" delete "rubber" and
insert - - - polystyrene - - -.

Signed and sealed this 1st day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,812,897      Dated May 28, 1974

Inventor(s) George A. Latinen

It is certified that error appears in the above-identified patent and that said Letters Patent are hereby corrected as shown below:

Please correct the filing date to read
       - - - August 16, 1971 - - -

Signed and sealed this 3rd day of December 1974.

(SEAL)
Attest:

McCOY M. GIBSON JR.　　　　　　　C. MARSHALL DANN
Attesting Officer　　　　　　　　　Commissioner of Patents